Patented Oct. 31, 1950

2,528,337

UNITED STATES PATENT OFFICE 2,528,337

STABILIZED POLYVINYL ACETAL COMPOSITIONS

Francis T. Buckley, West Springfield, Mass., assignor to Monsanto Chemical Company, St. Louis, Mo., a corporation of Delaware No Drawing. Application December 8, 1949, Serial No. 131,923

4 Claims. (Cl. 260—45.7)

This invention relates to polyvinyl acetal resin compositions. More particularly, the invention relates to polyvinyl acetal interlayers for safety glass.

Polyvinyl acetal resin compositions have been used for some time as the interlayer for safety glass. Unlike previously used interlayers, polyvinyl acetal resin interlayers may be cemented to glass by the application of heat and pressure in the absence of an adhesive. Safety glass produced in this manner has been successfully used in various vehicles under a wide range of conditions.

However, a great deal of difficulty has been experienced in producing satisfactory adhesion of the polyvinyl acetal resin interlayer to glass in the presence of water even in such small amounts as are present in highly humid air. The problem is made more serious by the general practice of coating the interlayer with a water-soluble pulverulent material to prevent adhesion of the material to itself during shipping and storage. The powder must be removed in a water bath and presents a critical drying problem to safety glass manufacturers.

An object of this invention is to provide a polyvinyl acetal resin interlayer for safety glass.

A further object is to provide an interlayer, the adhesion of which to glass is substantially unaffected by water.

These and other objects are attained by incorporating a small amount of trialkyl fluorosilane in a plasticized polyvinyl acetal resin composition.

The following examples are given in illustration and are not intended as limitations upon the scope of this invention. Where parts are mentioned they are parts by weight.

The following compositions were prepared:

by the following method which is the standard method used throughout the laminated glass industry.

Each laminate is conditioned for the test by subjecting it to a temperature of 0° F. for about one hour. The conditioned laminate is then held against a heavy metal plate set at an incline so that only one edge of the glass contacts the plate. The lamination is then hammered at the line of contact of the glass and the metal plate using the flat end of a one-pound ball peen hammer. The hammering takes the form of solid blows close together until about 12 square inches of glass are completely pulverized with no flat glass surface remaining. Loose glass particles are removed by shaking the lamination which is then allowed to warm up to room temperature.

The adhesion is graded on an arbitrary scale of 0–10 corresponding to the percentage, on an area basis, of unexposed interlayer. The following table sets forth the arbitrary scale against the corresponding percent of approximate area of unexposed interlayer.

Table I

| Grading | Percent Unexposed Interlayer |
|---|---|
| 10 | 100 |
| 9 | 98 |
| 8 | 95 |
| 7 | 90 |
| 6 | 80 |
| 5 | 60 |
| 4 | 40 |
| 3 | 15 |
| 2 | 10 |
| 1 | 5 |
| 0 | 0 |

| Examples | A | B | C | D | E | F | G | H |
|---|---|---|---|---|---|---|---|---|
|  | Parts | Parts | Parts | Parts | Parts | Parts | Parts | Parts |
| Polyvinyl Butyral Resin | 100 | 100 | 100 | 100 | 100 | 100 | 100 | 100 |
| Dibutyl Cellosolve Adipate | 40 | 40 | 40 | 40 | 40 | 40 | 40 | 40 |
| Tri(2-ethyl hexyl) Fluorosilane | 1 | 1 | 2 | 2 |  |  |  |  |
| Tri-octadecyl Fluorosilane |  |  |  |  | 1 | 1 |  |  |
| Water—Per cent of total composition | 0.2 | 1.0 | 0.2 | 1.0 | 0.2 | 1.0 | 0.2 | 1.0 |

The polyvinyl butyral resin contained approximately 18% hydroxyl groups calculated as polyvinyl alcohol and approximately 2% acetate groups calculated as polyvinyl acetate.

The ingredients were blended in a Baker-Perkins mixer and then skived into a thin sheet. Laminations were prepared from the sheets by preparing a sandwich consisting of two panes of glass and one sheet of interlayer, subjecting the sandwich to a temperature of 275° F. and a pressure of 185 p. s. i. for 10 minutes and then cooling the laminated sandwiches.

The laminations were then tested for adhesion

The results obtained by subjecting laminates made from each of the interlayers shown above to the adhesion test are set forth in Table II.

Table II

| Interlayer | A | B | C | D | E | F | G | H |
|---|---|---|---|---|---|---|---|---|
| Adhesion | 10 | 6 | 9 | 3 | 9 | 2 | 6 | 1 |

These results disclose that the unmodified compositions G and H had fair adhesion with low water content and practically no adhesion with high water content. Composition B shows the remarkable increase in adhesion at high water content for a composition containing one part of tri(2-ethyl hexyl) fluorosilane. Composition A is truly remarkable since its adhesion at low water content is practically perfect. Compositions C, D, E and F show a substantial increase in adhesion at high water content and an even greater increase at low water content.

The compositions containing trialkyl fluorosilanes were found to have the additional valuable property of being stable against color development and decomposition. This effect is strikingly illustrated by a rapid ageing test in which said compositions were subjected to vigorous masticating action at 150° C. After 17½ minutes of test, the compositions were still clear and undecomposed whereas composition G, containing no trialkyl fluorosilane, was a dirty yellow at the end of 12 minutes in this test.

The stabilizing action of the trialkyl fluorosilanes is effective at concentrations ranging from 0.5 to 5.0 parts per 100 parts of resin. Below 0.5 part, little stabilizing action is evident and no substantial increase in adhesion of the interlayer to glass is noted. Between 0.5 and 1.5 parts of trialkyl fluorosilane, substantial increase in adhesion occurs.

Other well known plasticizers for polyvinyl acetal resins may be used to replace the dibutyl cellosolve adipate in part or in whole. Among the plasticizers are dibutyl sebacate, triethylene glycol di-2 ethyl hexoate, dialkyl phthalates, triaryl phosphates, etc.

The trialkyl fluorosilanes are monomeric solids of the formula $R_3F$ Si, wherein R is an alkyl group such as methyl, ethyl, isopropyl, n-butyl, isobutyl amyl, ethyl-hexyl, decyl, lauryl, octadecyl, etc. All three of the alkyl groups may be the same or they may be different such as diethyl butyl fluorosilane, butyl dioctyl fluorosilane, methyl ethyl butyl fluorosilane, etc.

The polyvinyl acetal resins employed according to this invention may be made by reacting an aldehyde with a partially or completely hydrolyzed polyvinyl ester. U. S. Patent to Morrison et al., Reissue 20,430, dated June 29, 1937, illustrates suitable methods for preparing such resins. Polyvinyl acetal resins prepared in this manner may have a certain number of ester groups, originally present in the polyvinyl ester, which have not been removed, as well as a certain number of hydroxyl groups (which have replaced ester groups) and have not been replaced with acetal groups.

Polyvinyl acetal resins may be made from various aldehydes or mixtures thereof or even from ketones containing an active carbonyl group or from mixtures of aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower aliphatic aldehydes are preferred. In particular, polyvinyl acetal resins made with saturated aliphatic aldehydes containing less than 6 carbon atoms and especially those made with formaldehyde, acetaldehyde and butyraldehyde and mixtures thereof are preferred.

According to one embodiment of the present invention, the polyvinyl acetal resins employed may be considered to be made up, on a weight basis, of 5–25% hydroxyl groups calculated as polyvinyl alcohol, 0–40% acetate groups calculated as polyvinyl acetate and the balance substantially acetal.

When the acetal is butyraldehyde acetal, according to one embodiment of this invention, the polyvinyl acetal resin contains, on a weight basis, 16–20% hydroxyl groups calculated as polyvinyl alcohol and 0–3% acetate groups calculated as polyvinyl acetate and the balance substantially butyraldehyde acetal.

When the acetal is formaldehyde acetal, according to one embodiment of this invention, the polyvinyl acetal resin may contain 5–8% hydroxyl groups calculated as polyvinyl alcohol, 10–16% acetate groups calculated as polyvinyl acetate and the balance substantially formaldehyde acetal.

An example of a polyvinyl acetaldehyde acetal resin is one containing 7% hydroxyl groups calculated as polyvinyl alcohol, 17% acetate groups calculated as polyvinyl acetate and the balance substantially acetaldehyde acetal.

An example of a mixed acetal resin is one which contains 13% hydroxyl groups calculated as polyvinyl alcohol, 2–6% acetate groups calculated as polyvinyl acetate and the balance acetaldehyde and butyraldehyde acetal groups, in a molar ratio of 65–50% acetaldehyde and 35–50% butyraldehyde acetal groups.

The products of this invention are particularly advantageous in that they permit the lamination of glass to polyvinyl acetal interlayers with minimum precautions as to water content of the interlayer. Thus, many rejections of finished laminations due to unsatisfactory adhesion are eliminated and complaints from users of the laminated glass are substantially lessened.

It is obvious that many variations may be made in the products and processes of this invention without departing from the spirit and scope thereof as defined in the appended claims.

What is claimed is:

1. A composition comprising a polyvinyl acetal resin, a plasticizer and from 0.5 to 5.0 parts per 100 parts of resin of a trialkyl fluorosilane.

2. A composition as in claim 1 wherein the polyvinyl acetal resin is a polyvinyl butyraldehyde acetal resin.

3. A composition as in claim 1 wherein the trialkyl fluorosilane is tri(2-ethyl hexyl) fluorosilane.

4. A composition as in claim 3 in which the amount of tri(2-ethyl hexyl) fluorosilane is limited to 0.5 to 1.5 parts per 100 parts of resin.

FRANCIS T. BUCKLEY.

No references cited.